United States Patent
Yu

(10) Patent No.: US 9,647,440 B2
(45) Date of Patent: May 9, 2017

(54) COMPOSITE DIRECT CONNECTOR FOR HIGH VOLTAGE LINE

(71) Applicant: Korea Electric Power Corporation, Seoul (KR)

(72) Inventor: Jeunghun Yu, Jinju-si (KR)

(73) Assignee: Korea Electric Power Corporation, Seoul (KR)

( * ) Notice: Subject to any disclaimer, the term of this patent is extended or adjusted under 35 U.S.C. 154(b) by 0 days.

(21) Appl. No.: 14/888,348

(22) PCT Filed: Jul. 1, 2014

(86) PCT No.: PCT/KR2014/005855
§ 371 (c)(1),
(2) Date: Oct. 30, 2015

(87) PCT Pub. No.: WO2015/026056
PCT Pub. Date: Feb. 26, 2015

(65) Prior Publication Data
US 2016/0064913 A1    Mar. 3, 2016

(30) Foreign Application Priority Data
Aug. 23, 2013 (KR) .......................... 10-2013-0100393

(51) Int. Cl.
    *H02G 15/02*      (2006.01)
    *H02G 15/105*      (2006.01)
    *H02G 15/188*      (2006.01)

(52) U.S. Cl.
    CPC ........... *H02G 15/02* (2013.01); *H02G 15/105* (2013.01); *H02G 15/188* (2013.01)

(58) Field of Classification Search
    CPC .................................................. H01R 9/0503
(Continued)

(56) References Cited

U.S. PATENT DOCUMENTS

| | | | | |
|---|---|---|---|---|
| 3,564,117 A | * | 2/1971 | Scheffler | H02G 15/085 174/75 C |
| 4,144,404 A | * | 3/1979 | De Groef | B29C 61/0616 174/84 R |

(Continued)

FOREIGN PATENT DOCUMENTS

| EP | 1 195 872 B1 | 3/2004 |
|---|---|---|
| JP | 7-29781 U | 6/1995 |

(Continued)

OTHER PUBLICATIONS

International Search Report issued in International Application No. PCT/KR2014/005855 dated Oct. 13, 2014, with English translation.

*Primary Examiner* — Chau N Nguyen
(74) *Attorney, Agent, or Firm* — McDermott Will & Emery LLP

(57) ABSTRACT

The present invention relates to a composite direct connector for a high voltage line. The composite direct connector for a high voltage line according to the present invention is characterized by comprising: a pair of terminal connecting rings electrically connected to each other; and ground terminals installed on the terminal connecting rings, respectively, and having a neutral line of a high voltage line on one side and a neutral line of a high voltage line on the other side connected to each other. According to the present invention as described thus far above, a neutral line for connecting a high voltage line and for external grounding is rendered unnecessary by a connecting member, thus making it easy to arrange ground wires within a structure, and affording easy construction without regard to access space.

4 Claims, 11 Drawing Sheets

(58) Field of Classification Search
USPC .................................. 174/88 C, 88 R, 78
See application file for complete search history.

(56) References Cited

U.S. PATENT DOCUMENTS

| | | | | |
|---|---|---|---|---|
| 4,164,621 A | * | 8/1979 | Silva | H02G 15/105 156/49 |
| 4,503,283 A | * | 3/1985 | Hancock | H02G 15/117 156/49 |
| 5,024,608 A | * | 6/1991 | Heng | H01R 9/0503 439/578 |
| 5,028,742 A | * | 7/1991 | Redman | H01R 9/05 174/78 |
| 6,069,320 A | * | 5/2000 | Rocci | H01R 4/70 174/84 R |
| 2010/0276196 A1 | | 11/2010 | Seraj et al. | |
| 2010/0279542 A1 | | 11/2010 | Seraj et al. | |

FOREIGN PATENT DOCUMENTS

| | | |
|---|---|---|
| JP | 2011-193569 A | 9/2011 |
| KR | 10-0777062 B1 | 11/2007 |
| KR | 20-0444333 Y1 | 5/2009 |
| KR | 10-2011-0105067 A | 9/2011 |
| WO | 2009/137013 A1 | 11/2009 |

* cited by examiner

COMPOSITE DIRECT CONNECTOR FOR HIGH VOLTAGE LINE

RELATED APPLICATIONS

This application is the U.S. National Phase under 35 U.S.C. §371 of International Application No. PCT/KR2014/005855, filed on Jul. 1, 2014, which in turn claims the benefit of Korean Application No. 10-2013-0100393, filed on Aug. 23, 2013, the disclosures of which are incorporated by reference herein.

TECHNICAL FIELD

The present invention relates generally to a composite direct connector for a high voltage line. More particularly, the present invention relates to a composite direct connector for a high voltage line, which is capable of using both non-ground connection and ground connection.

BACKGROUND ART

Generally, a distribution line installed in the ground is a high-voltage (23 kV) line. As shown in FIG. 1, such a high voltage line 10 includes a main line 11 in which high voltage flows, an insulator 12 that surrounds an outside of the main line 11, a neutral line 13 (shield line) and an insulating sheath 14 that are provided on an outside of the insulator 12.

In order to prevent a short-circuit or electric-shock accident from occurring by an electric field formed around the high-voltage line when a high-voltage current flows through such a high-voltage line, as shown in FIG. 2, the neutral line 13 is grounded via a clamp 20 outside the high voltage line 10, and the grounded neutral line 13 is grounded to a ground via a ground rod 30.

However, the above-mentioned conventional method of grounding the high voltage line may undesirably cause fault contact due to the mixing of neutral lines in a manhole or a structure, and may lead to a reduction in work space, thus causing a safety accident during work.

Further, this method is problematic in that dirt adheres to the neutral line exposed to the outside of the high voltage line, thus accelerating deterioration, causing degradation due to the defective contact of the neutral line, and consequently leading to the failure of the distribution line.

As the related art, Korean Patent No. 10-0777062, which is entitled DIRECT CONNECTOR FOR DIFFERENT CABLES and was registered on Nov. 9, 2007, has been proposed.

DISCLOSURE

Technical Problem

Accordingly, the present invention has been made keeping in mind the above problems occurring in the prior art, and an object of the present invention is to provide a composite direct connector for a high voltage line, in which a neutral line for connecting a high voltage line and for external grounding is rendered unnecessary by a connecting member, thus making it easy to arrange ground wires within a structure, and affording easy construction without regard to access space.

Another object of the present invention is to provide a composite direct connector for a high voltage line, in which a convenient construction is ensured when a high voltage line is grounded, thus reducing a construction cost and a materials cost, and which is effective in space utilization and in preventing a failure due to a ground wire.

A further object of the present invention is to provide a composite direct connector for a high voltage line, which is capable of selectively using a connecting member, thus enabling both ground connection and non-ground connection when high voltage lines are connected to each other.

Technical Solution

In order to accomplish the above objects, the present invention provides a composite direct connector for a high voltage line, including a pair of terminal connecting rings electrically connected to each other; and ground terminals installed on the terminal connecting rings, respectively, to cause a neutral line of a high voltage line on a first side and a neutral line of a high voltage line on a second side to be connected to each other.

The composite direct connector may further include a shield line provided between the pair of terminal connecting rings to electrically connect the pair of terminal connecting rings to each other, wherein an outside of the shield line may be surrounded by a sheath, and the shield line may have therein a hollow portion to accommodate main lines of the high voltage lines that are connected to each other.

The composite direct connector may further include a connecting member connected to the shield line, and coupled with a ground rod.

The connecting member may include a fastening body surrounding an outer circumference of the shield line, a first coupling portion provided on a first side of the fastening body, and a second coupling portion provided on a second side of the fastening body, and coupled with the first coupling portion via a bolt to secure the fastening body to the outer circumference of the shield line, the second coupling portion being spaced apart from the first coupling portion to define a space to which the terminal of the ground rod is coupled.

A first side of each of the ground terminals may be coupled to the terminal connecting ring, and a support clamp may be provided in the ground terminal to secure a neutral line that may be fitted from a second side of the ground terminal.

The support clamp may include a first extending portion electrically connected with the terminal connecting ring, a first bent portion bent at an end of the first extending portion towards an inner wall of the ground terminal, a second extending portion extending from an end of the first bent portion along the inner wall of the ground terminal towards the second side of the ground terminal, a second bent portion bent at an end of the second extending portion towards an inside of an end of an opening formed in the second side of the ground terminal, and a third bent portion bent at an end of the second bent portion towards the inner wall of the ground terminal that faces the second extending portion.

The composite direct connector may further include a waterproof cover covering an outside of a junction between the ground terminal and the neutral line.

Advantageous Effects

As described above, the present invention is advantageous in that a neutral line for connecting a high voltage line and for external grounding is rendered unnecessary by a connecting member, thus making it easy to arrange ground wires within a structure, and affording easy construction without regard to access space.

Further, the invention is advantageous in that a convenient construction is ensured when a high voltage line is grounded, thus reducing a construction cost and a materials cost, and which is effective in space utilization and in preventing a failure due to a ground wire.

Furthermore, the invention is advantageous in that it is capable of selectively using a connecting member, thus enabling both ground connection and non-ground connection when high voltage lines are connected to each other.

BEST MODE

Figure 1:
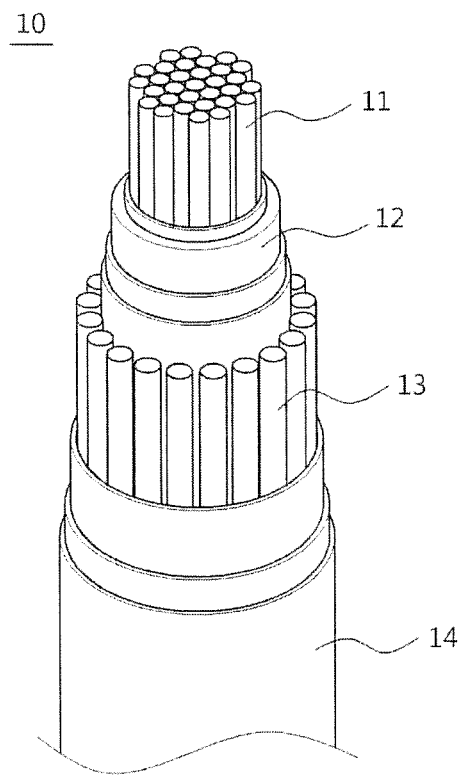
FIG. 1 is a sectional view illustrating a high voltage line.
Figure 2:
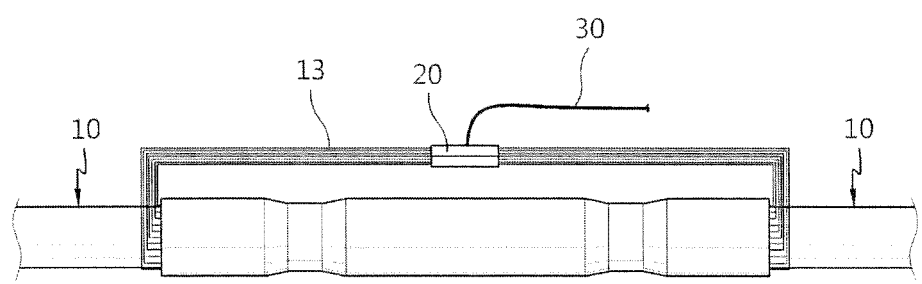
FIG. 2 is a schematic front view illustrating a state where a neutral line is grounded in a conventional method of grounding a high voltage line.

Reference now should be made to the drawings, in which the same reference numerals are used throughout the different drawings to designate the same or similar components. In the following description, when the functions of conventional elements and the detailed description of elements related with the present invention may make the gist of the present invention unclear, a detailed description of those elements will be omitted.

The present invention permits both non-ground connection and ground connection when two high voltage lines are connected to each other using a connector. First, the non-ground connection method will be described.

Figure 3:
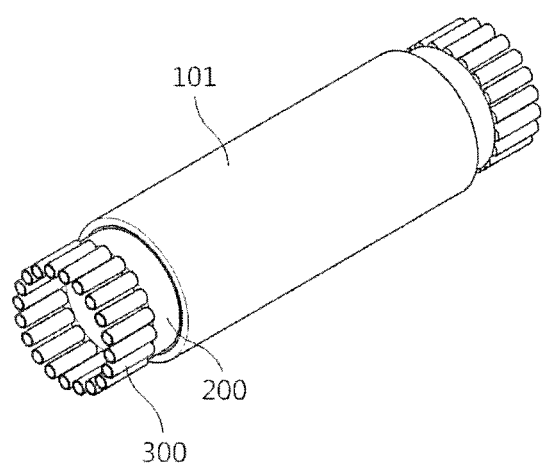
FIG. 3 is a perspective view illustrating a composite direct connector for a high voltage line according to a preferred embodiment of the present invention.
Figure 4:
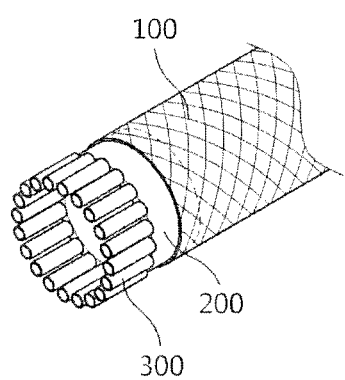
FIG. 4 is a perspective view illustrating a state where a sheath of the composite direct connector for the high voltage line according to the preferred embodiment of the present invention is stripped.

FIG. 3 is a perspective view illustrating a composite direct connector for a high voltage line according to a preferred embodiment of the present invention, and FIG. 4 is a perspective view illustrating a state where a sheath of the composite direct connector for the high voltage line according to the preferred embodiment of the present invention is stripped.

The composite direct connector for the high voltage line according to the preferred embodiment of the present invention includes a shield line 100, a terminal connecting ring 200, and a ground terminal 300. All of the shield line 100, the terminal connecting ring 200, and the ground terminal 300 are made of a conductor.

As shown in FIG. 4, the shield line 100 is a close-mesh-shaped member. Such a shield line 100 is connected to neutral lines 13 of two high voltage lines 10 and 10' that are connected to the ground terminal 300 via the terminal connecting ring 200 and the ground terminal 300.

Moreover, as shown in FIG. 3, an outside of the shield line 100 is surrounded by a sheath 101 made of an insulating material so as to be sealed from the outside.

Terminal connecting rings 200 are provided on both sides of the shield line 100, respectively. One side of each terminal connecting ring 200 is connected to the shield line 100 to serve as a medium for electrically connecting the ground terminal 300 with the shield line 100. As shown in FIG. 4, one side of the terminal connecting ring 200 is preferably connected to an inner circumference of the shield line 100, but the invention is not limited thereto.

Meanwhile, the ground terminal 300 is provided on the other side of the terminal connecting ring 200. Such a ground terminal 300 is a plurality of members that are installed on the other side of the terminal connecting ring 200.

A fitting groove 310 is preferably formed on one side of such a ground terminal 300 to be fitted over a protrusion 210 that is formed on an end of the terminal connecting ring 200. Accordingly, the ground terminal 300 and the terminal connecting ring 200 are electrically connected to each other.

The ground terminals 300 are provided on both sides of the terminal connecting ring 200, respectively, to cause the neutral line 13 of the high voltage line 10 on one side and the neutral line 13 of the high voltage line 10' on a remaining side (the other side) to be electrically connected to each other. A support clamp 320 is installed in the ground terminal 300. Preferably, the other side of the ground terminal 300 is open so that the neutral line 13 is fitted and inserted therein.

Figure 5:
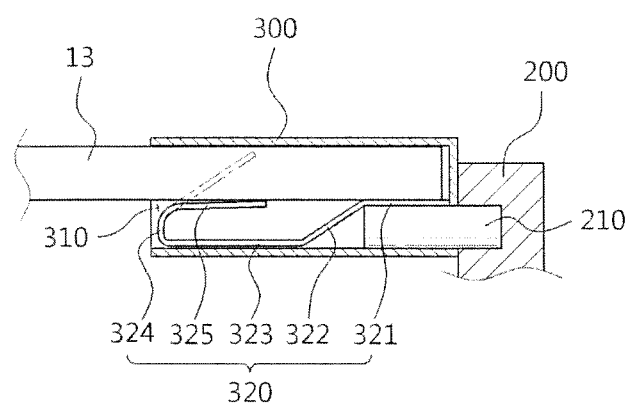
FIG. 5 is a view illustrating a state where a terminal connecting ring and a neutral line are connected to a ground terminal of the composite direct connector for the high voltage line according to the preferred embodiment of the present invention.

The support clamp is a member that serves to fix the neutral line 13 that is fitted from the other side of the ground terminal 300. As shown in FIG. 5, such a support clamp 320 includes a first extending portion 321, a first bent portion 322, a second extending portion 323, a second bent portion 324, and a third bent portion 325. The above-mentioned support clamp 320 is preferably made of a conductor material having elasticity like a plate spring.

The first extending portion 321 is a member that is connected to the fitting groove 310 formed on one side of the ground terminal 300. The first bent portion 322 is formed on an end of such a first extending portion 321 in such a way as to be bent towards an inner wall of the ground terminal 300.

Further, the second extending portion 323 is formed on an end of the first bent portion 322 that is bent towards the inner wall of the ground terminal 300, in such a way as to extend along the inner wall of the ground terminal 300 to an opening formed in the other side of the ground terminal 300.

In addition, the second bent portion 324 is formed on an end of the second extending portion 323 that extend to the opening formed in the other side of the ground terminal 300, in such a way as to be bent towards an inside of an end of the opening formed in the other side of the ground terminal 300. The third bent portion 325 is formed on an end of such a second bent portion 324, in such a way as to be bent towards the inner wall of the ground terminal 300 that faces the second extending portion 323.

As described above, the neutral line 13 fitted into the opening formed in the other side of the ground terminal 300 enters between the third bent portion 325 and the inner wall of the ground terminal 300 while coming into contact with the third bent portion 325. Accordingly, the third bent portion 325 is curved to generate a reaction force that acts as an elastic restoring force. Such an elastic restoring force allows the neutral line 13 to be conveniently and firmly secured to an interior of the ground terminal 300 while being pressed against the inner wall of the ground terminal 300.

Now, the method of connecting two high voltage lines to each other by the non-ground connection method of the composite direct connector for the high voltage line according to the preferred embodiment of the present invention will be described with reference to FIGS. 6 and 7.

A worker strips the insulating sheath 14 and the insulator 12 to connect main lines 11 of the two high voltage lines 10 and 10' that are desired to be connected to each other.

Subsequently, among the two high voltage lines 10 and 10', a waterproof cover 400 and the connector of the present invention including the shield line 100, the terminal connecting ring 200 and the ground terminal 300 as described above are sequentially fitted over one high voltage line 10, while the waterproof cover 400 is fitted over the other high voltage line 10'.

In this regard, the waterproof cover 400 has a covering function to prevent water from entering a junction between the ground terminal 300 and the neutral line 13.

Figure 6:
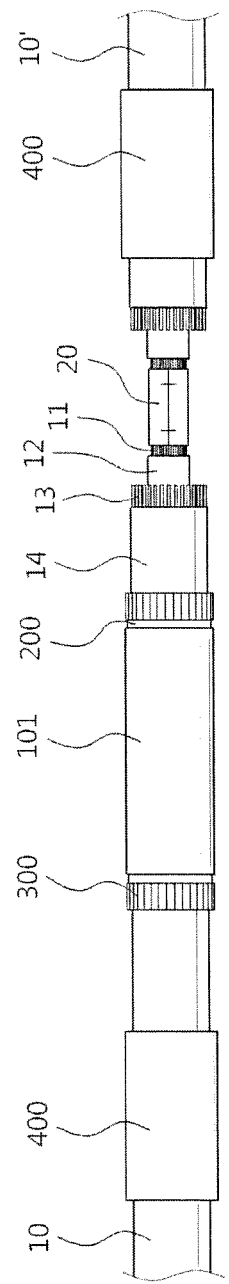
FIGS. 6 and 7 are conceptual views illustrating a state where two high voltage lines are connected to each other by a non-ground connection method using the composite direct connector for the high voltage line according to the preferred embodiment of the present invention.
Figure 7:
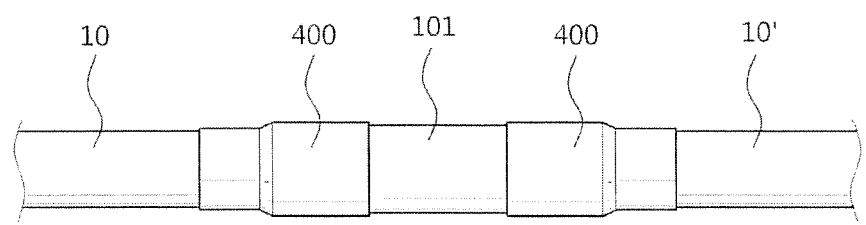

Thereafter, as shown in FIG. 6, the main lines 11 of the two high voltage lines 10 and 10' from which the insulating sheath 14 and the insulator 12 are stripped are connected to each other using a sleeve 20. The connector of the present invention fitted over one high voltage line 10 is moved to an outside of the sleeve 20 to surround the junction of the main lines 11.

Subsequently, the neutral line 13 of one high voltage line 10 and the neutral line 13 of the other high voltage line 10' are connected to the ground terminal 300, thus making an electrically connected state.

Thereafter, the waterproof covers 400 fitted over one high voltage line 10 and the other high voltage line 10' are moved to cover the junction between the ground terminal 300 and the neutral line 13.

Preferably, the waterproof cover 400 is made of a rubber material, for example.

Next, the case where the grounding is performed when the high voltage lines are connected to each other using the present invention will be described.

In the case of consecutively connecting two or more high voltage lines to each other, a connecting member 500 is installed at a place where the grounding is required and a terminal 31 of the ground rod 30 is connected to the connecting member 500, as shown in FIGS. 8 to 11.

The connecting member 500 is a member that is provided on an outer circumference of the shield line 100. Such a connecting member 500 is made of a conductor material, similarly to the above-mentioned shield line 100, terminal connecting ring 200 and ground terminal 300.

Figure 9:
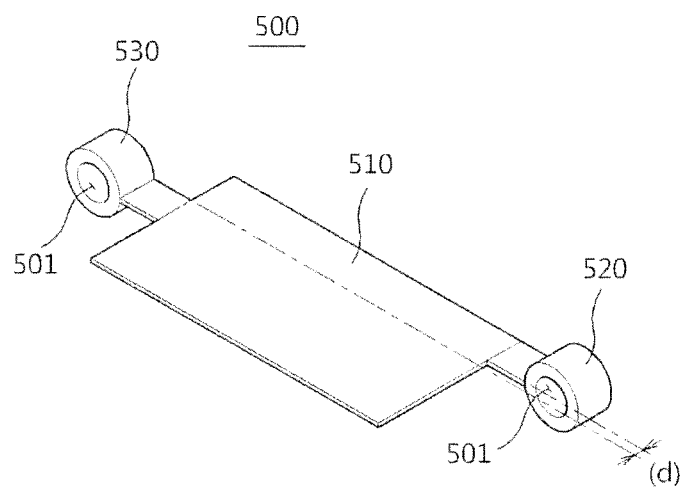
FIG. 9 is a development view illustrating the connecting member of the composite direct connector for the high voltage line according to the preferred embodiment of the present invention.
Figure 10:
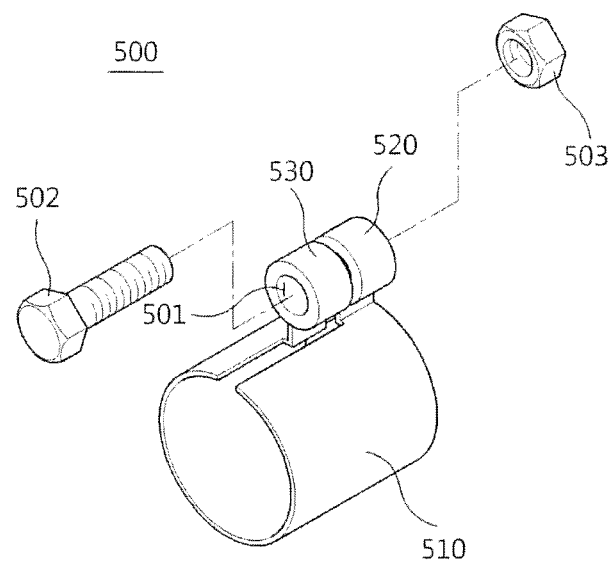
FIG. 10 is a front view illustrating a state where a first coupling portion and a second coupling portion of the connecting member of the composite direct connector for the the high voltage line according to the preferred embodiment of the present invention are fastened by a bolt.
Figure 11:
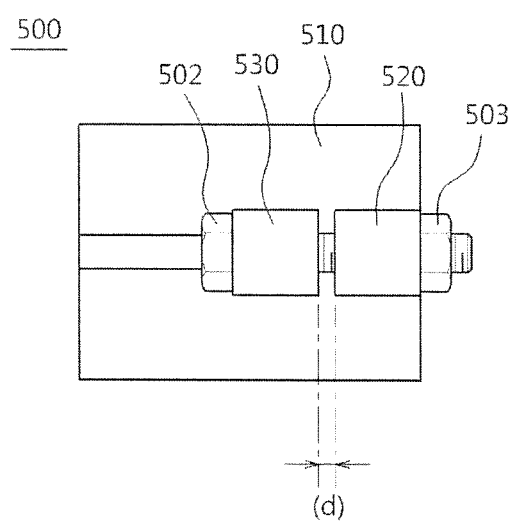
FIG. 11 is a plan view of FIG. 10.

FIG. 9 depicts a development view of the connecting member 500. The connecting member 500 includes a fastening body 510, a first coupling portion 520, and a second coupling portion 530.

The fastening body 510 is a member that surrounds the outer circumference of the shield line 100. As shown in FIG. 9, the fastening body 510 is made to have an approximate rectangular shape. The first coupling portion 520 is provided on one side of the fastening body 510, while the second coupling portion 530 is provided on the other side thereof.

The first coupling portion 520 and the second coupling portion 530 are connected to each other via a bolt 502 and a nut 503 in the state where the fastening body 510 is curved to surround the outer circumference of the shield line 100. The fastening operation using the bolt 502 and the nut 503 allows the fastening body 510 to be firmly secured to the outer circumference of the shield line 100. Further, since the bolt 502 is connected with the terminal 31 of the ground rod 30, it is preferably made of a conductor material.

Meanwhile, in the state where the fastening body 510 is curved, the first and second coupling portions 520 and 530 are preferably arranged to define a predetermined spaced (about 1 cm to 3 cm) between a lower end of the first coupling portion 520 provided on one side of the fastening body 510 and an upper end of the second coupling portion 530 provided on the other side thereof and thereby define the space d to which the terminal 31 of the ground rod 30 may be connected.

Hereinafter, the method of grounding using the connecting member when the high voltage lines of the composite direct connector for the high voltage line according to the preferred embodiment of the present invention are connected to each other will be described with reference to FIG. 8. Since the method of electrically connecting two high voltage lines 10 and 10' to each other using the shield line 100, the terminal connecting ring 200 and the ground terminal 300 is the same as the above-mentioned non-ground connection method, a detailed description thereof will be omitted herein.

In the state where two high voltage lines 10 and 10' are electrically connected to each other, the fastening body 510 of the connecting member 500 is curved to surround the outer circumference of the shield line 100 and then is pushed between the shield line 100 and the sheath 101 so that the shield line 100 and the fastening body 510 are electrically connected to each other.

Subsequently, in the state where the fastening body 510 is curved, the bolt 502 is inserted from one side to simultaneously pass through through-holes 501 formed in the first and second coupling portions 520 and 530, and the nut 503 on the other side is fastened to the outer circumference of an end of the bolt 502 inserted into the through-holes 501, thus allowing the fastening body 510 to be firmly secured to the outer circumference of the shield line 100.

The terminal 31 of the ground rod 30 may be installed between the first coupling portion 520 and the second coupling portion 530. For example, if the terminal 31 of the ground rod 30 is made in the shape of a ring, as shown by (a) encircled in FIG. 8, in the state where the terminal 31 is positioned in the space d between the first and second coupling portions 520 and 530, the terminal 31 may be provided on the outer circumference of the bolt 502 with the bolt 502 passing through the terminal 31.

Figure 8:
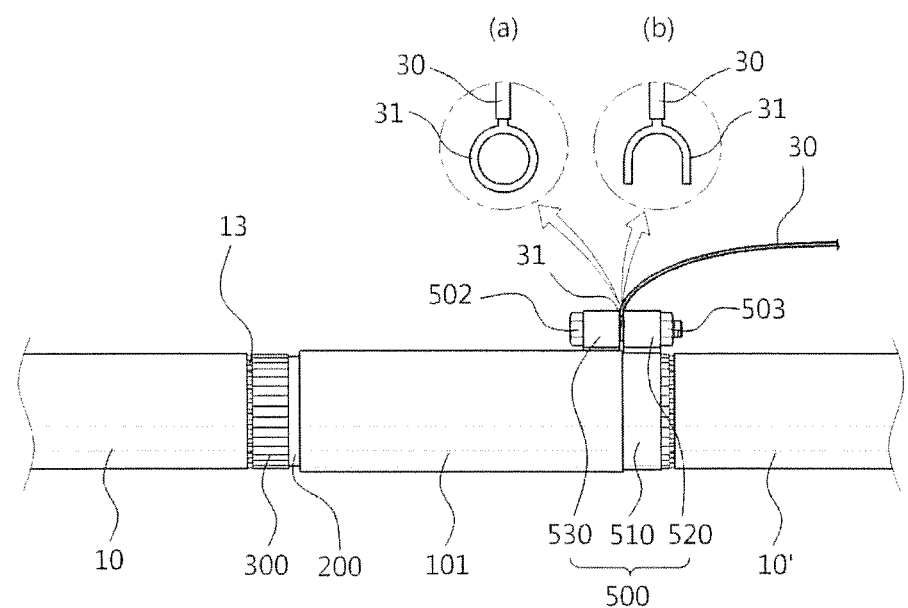
FIG. 8 is a conceptual view illustrating a state where grounding is performed using a connecting member of the composite direct connector for the high voltage line according to the preferred embodiment of the present invention.

Meanwhile, if the terminal 31 of the ground rod 30 is made in the shape of a ring that is partially open, as shown by (b) encircled in FIG. 8, the terminal 31 is pushed into the space d between the first coupling portion 520 and the second coupling portion 530, and then is secured by tightening the bolt 502 and the nut 503 with the terminal coming into contact with the outer circumference of the bolt 502.

As described above, the present invention provides a composite direct connector for a high voltage line, in which a neutral line for connecting a high voltage line and for external grounding is rendered unnecessary by a connecting member, thus making it easy to arrange ground wires within a structure, and affording easy construction without regard to access space.

Further, the present invention provides a composite direct connector for a high voltage line, in which a convenient construction is ensured when a high voltage line is grounded, thus reducing a construction cost and a materials cost, and which is effective in space utilization and in preventing a failure due to a ground wire.

Furthermore, the present invention provides a composite direct connector for a high voltage line, which is capable of selectively using a connecting member, thus enabling both ground connection and non-ground connection when high voltage lines are connected to each other.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composite direct connector for a high voltage line, comprising:
    a pair of terminal connecting rings electrically connected to each other;
    a plurality of ground terminals disposed on each terminal connecting ring to connect neutral lines of a first side of the high voltage line and neutral lines of a second side of the high voltage line to each other;
    a shield line provided between the pair of terminal connecting rings to electrically connect the pair of terminal connecting rings to each other,
    wherein an outer side of the shield line is surrounded by a sheath, and an inner side of the shield line has a hollow portion to accommodate main lines of the high voltage lines that are connected to each other; and
    a connecting member connected to the shield line and coupled with a ground rod,
    wherein the connecting member comprises:
        a fastening body surrounding an outer circumference of the shield line;
        a first coupling portion provided on a first side of the fastening body; and
        a second coupling portion provided on a second side of the fastening body, and coupled with the first coupling portion to secure the fastening body to the outer circumference of the shield line, the second coupling portion being spaced apart from the first coupling portion to define a space to which the terminal of the ground rod is coupled.

2. The composite direct connector as set forth in claim 1, further comprising:
    a waterproof cover covering an outside of a junction between the ground terminal and the neutral line.

3. The connecting member as set forth in claim 1, wherein the first coupling portion provided on the first side of the fastening body is coupled with the second coupling portion via a bolt to secure the fastening body to the outer circumference of the shield line.

4. A composite direct connector for a high voltage line, comprising:
    a pair of terminal connecting rings electrically connected to each other; and
    a plurality of ground terminals disposed on each terminal connecting ring to connect neutral lines of a first side of the high voltage line and neutral lines of a second side of the high voltage line to each other,
    wherein a first side of each of the ground terminals is coupled to the terminal connecting ring, and
    a support clamp is provided in the ground terminal to secure a neutral line that is fitted from a second side of the ground terminal, comprising:
        a first extending portion electrically connected with the terminal connecting ring;
        a first bent portion bent at an end of the first extending portion towards an inner wall of the ground terminal;
        a second extending portion extending from an end of the first bent portion along the inner wall of the ground terminal towards the second side of the ground terminal;
        a second bent portion bent at an end of the second extending portion towards an inside of an end of an opening formed in the second side of the ground terminal; and
        a third bent portion bent at an end of the second bent portion towards the inner wall of the ground terminal that faces the second extending portion.

* * * * *